A. N. GODDARD.
MILLING CUTTER.
APPLICATION FILED APR. 30, 1920.

1,365,908.

Patented Jan. 18, 1921.

INVENTOR
A. N. Goddard
BY
Edward N. Pagelsen
ATTORNEY

UNITED STATES PATENT OFFICE.

ARCHIBALD N. GODDARD, OF DETROIT, MICHIGAN, ASSIGNOR TO GODDARD AND GODDARD COMPANY, OF DETROIT, MICHIGAN, A CORPORATION OF MICHIGAN.

MILLING-CUTTER.

1,365,908.  Specification of Letters Patent.  Patented Jan. 18, 1921.

Application filed April 30, 1920. Serial No. 377,815.

*To all whom it may concern:*

Be it known that I, ARCHIBALD N. GODDARD, a citizen of the United States, and residing at Detroit, in the county of Wayne and State of Michigan, have invented a new and Improved Milling-Cutter, of which the following is a specification.

This invention relates to milling cutters, particularly to such as have removable inserted cutting teeth which are rigidly locked in slots in the peripheries of the bodies of cutters, and its object is to provide means for not only positioning these teeth in such slots with great accuracy, but also for preventing lateral movement of the teeth in the slots or pockets after they are positioned.

This invention consists in combination with the circular body of a cutter having marginal projections separated by transverse slots or pockets in its periphery, of a series of cutting teeth mounted in said slots, means to secure said cutting teeth in position, said teeth and said projections being provided with registering grooves which are preferably radial to the axis of the cutter, and pins mounted in said grooves adapted to position the teeth longitudinally of the axis of the cutter.

Figure 1:
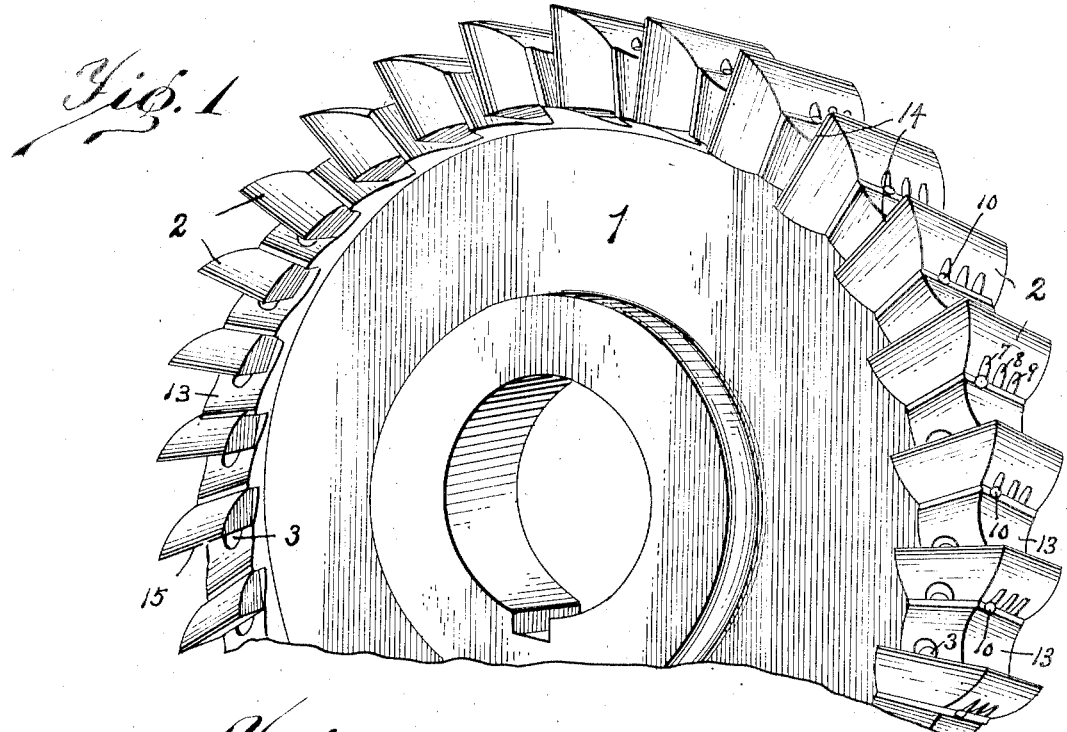
Figure 2:
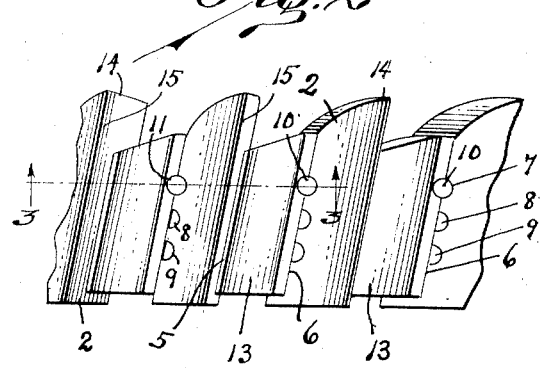
Figure 3:
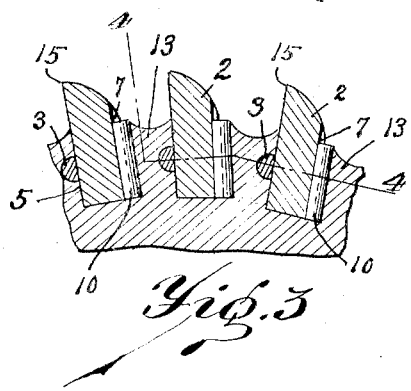
Figure 4:
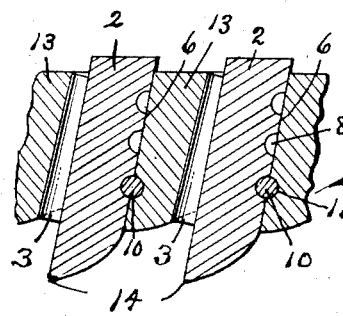

In the accompanying drawing, Figure 1 is a partial perspective of this improved milling tool. Fig. 2 is an edge view of a part thereof. Fig. 3 is a section on the line 3—3 of Fig. 2. Fig. 4 is a section on the line 4—4 of Fig. 3.

Similar reference characters refer to like parts throughout the several views.

The body 1 of the cutter, as shown in the drawings, is of well known shape, and this is provided with a number of longitudinal slots in its periphery, preferably at a slightly oblique angle to the side of the cutter, and the cutting teeth 2 may be formed with any desired type of cutting edges 14 and 15. These teeth may be locked in position in any desired manner, preferably by means of the pins 3 which are formed from cylindrical rods and are provided with inclined flat sides so as to constitute wedges. As the grooves in the faces 5 of the slots in the periphery of the cutter are rounded, the locking pins will adjust themselves to the front faces of the teeth and force them against the faces 6 of the slots.

These teeth are preferably made interchangeable, and each is formed with a plurality of grooves 7, 8 and 9 in its rear side to receive the positioning pins 10, which are mounted in proper grooves 11 in the faces 6 of the projections 13 between the slots in the periphery of the cutter body. These pins are preferably slightly more in the projections 13 than in the teeth 2 and will therefore be held in these projections so that the teeth may be removed without disturbing these pins. Each pin is thus positioned with great accuracy so that when the cutting teeth are inserted in their slots, their cutting edges 14 and 15 will all be practically in the same plane. After the teeth are in position, very little grinding will be necessary to true the teeth.

As these teeth wear they may be removed and accurately ground and then replaced. It is immaterial how the teeth are locked so long as they are rigidly held in position, the positioning of the teeth being entirely dependent upon the pins 10. After the teeth have been worn to such an extent that they can no longer be used when the pins 10 are in the radial grooves in the teeth next to the cutting edges 14, the teeth of the cutter will be positioned with these pins in the next adjacent grooves 8. The number of these grooves is of course limited only by the convenience of making a cutter of this character, and the teeth may be moved longitudinally of the axis of the cutter step by step. When these cutting teeth are re-ground by accurate machines, very little time is required in taking down and re-building one of these cutters. While the cutter shown in the drawing is for side facing work, it will be understood that cutters of this character may be employed for reaming and bottoming and such other classes of milling for which an inserted-tooth cutter is available.

The sizes and proportions of the various parts of this construction may all be changed by those skilled in the art without departing from the spirit of my invention as set forth in the following claims.

I claim:—

1. In a milling cutter, the combination of a body having a series of slots in its periphery, cutting teeth mounted in said slots, means for holding the cutting teeth in said slots, the rear side of each of said teeth being formed with a plurality of substantially radial grooves and the adjacent wall of each of said slots being formed with a registering groove, and pins mounted partly in the grooves in the teeth and partly in the grooves in the cutter body to prevent lateral movement of the teeth.

2. In a milling cutter, the combination of a body having a series of slots in its periphery, cutting teeth slidably mounted in the slots and each provided with a plurality of grooves which are substantially radial of the cutter when the teeth are in position, one wall of each slot being formed with a groove adapted to register with the grooves in the adjacent tooth, pins in said grooves to position said teeth longitudinally of the slots, and means to lock the teeth in position.

3. In a milling cutter, the combination of a body having a series of slots in its periphery, cutting teeth mounted in said slots, means engaging one side of each tooth to hold it from movement in one of a plurality of predetermined positions transversely of the cutter, and means engaging one other side of the tooth to lock it in position.

4. In a milling cutter, the combination of a body having a series of slots in its periphery, cutting teeth mounted in said slots and each provided with a plurality of substantially radial grooves in its rear side, means mounted in said grooves to hold the teeth in one of a plurality of positions in said slots, and means to lock the teeth in the selected position.

5. In a milling cutter, the combination of a plurality of members comprising a body having a series of slots in its periphery and cutting teeth adapted to be moved laterally to a plurality of predetermined positions, and means embodying grooves in one of said members and radial pins to hold the teeth from moving laterally in said slots.

ARCHIBALD N. GODDARD.